(12) United States Patent
Tolksdorf et al.

(10) Patent No.: US 11,242,047 B2
(45) Date of Patent: Feb. 8, 2022

(54) METHOD AND DEVICE FOR OPERATING A MOTOR VEHICLE

(71) Applicant: Robert Bosch GmbH, Stuttgart (DE)

(72) Inventors: Christian Tolksdorf, Stuttgart (DE); Bettina Crepin, Stuttgart (DE); Ralf Schaeffler, Steinheim (DE); Thomas Brettschneider, Leonberg (DE)

(73) Assignee: Robert Bosch GmbH, Stuttgart (DE)

( * ) Notice: Subject to any disclaimer, the term of this patent is extended or adjusted under 35 U.S.C. 154(b) by 159 days.

(21) Appl. No.: 16/195,266

(22) Filed: Nov. 19, 2018

(65) Prior Publication Data
US 2019/0161078 A1    May 30, 2019

(30) Foreign Application Priority Data

Nov. 24, 2017    (DE) .......................... 102017221097.4

(51) Int. Cl.
*B60W 30/06*    (2006.01)
*B60W 10/18*    (2012.01)
*B60W 10/04*    (2006.01)

(52) U.S. Cl.
CPC ............ *B60W 30/06* (2013.01); *B60W 10/04* (2013.01); *B60W 10/18* (2013.01); *B60W 2720/10* (2013.01)

(58) Field of Classification Search
CPC combination set(s) only.
See application file for complete search history.

(56) References Cited

U.S. PATENT DOCUMENTS

| 5,173,859 | A  | * | 12/1992 | Deering | ............. | B60K 31/0008 |
| | | | | | | 701/70 |
| 2006/0091728 | A1 | * | 5/2006 | Fulks | ........................ | B60T 7/22 |
| | | | | | | 303/193 |
| 2007/0027598 | A1 | * | 2/2007 | Mori | .................... | B60W 10/184 |
| | | | | | | 701/41 |
| 2013/0116089 | A1 | * | 5/2013 | Wegner | .................. | G05D 13/04 |
| | | | | | | 477/110 |
| 2016/0121898 | A1 | * | 5/2016 | Jo | ......................... | B60W 10/02 |
| | | | | | | 701/22 |

(Continued)

OTHER PUBLICATIONS

Eriksson, Jenny and Svensson, Lars, Tuning for Ride Quality in Autonomous Vehicle—Application to Linear Quadratic Path Planning Algorithm, Jun. 2015, Uppsala Universitet, p. 6 (Year: 2015).*

(Continued)

*Primary Examiner* — Aniss Chad
*Assistant Examiner* — Chase L Cooley
(74) *Attorney, Agent, or Firm* — Norton Rose Fulbright US LLP; Gerard Messina

(57) ABSTRACT

A method for operating a motor vehicle, the motor vehicle being automatically accelerated and decelerated as a function of an instantaneous position and a predefinable target location, so that it comes to a standstill at the target location, including the following steps: a) accelerating the motor vehicle, in particular from a standstill, to a predefined setpoint velocity; b) up to a predefined first distance of the motor vehicle to the target location, decelerating the motor vehicle to a predefined rolling velocity; c) starting at a predefined second distance of the motor vehicle to the target location, decelerating the motor vehicle to a standstill, the second distance to the target location being smaller than the first distance.

19 Claims, 2 Drawing Sheets

(56) References Cited

U.S. PATENT DOCUMENTS

| | | | | |
|---|---|---|---|---|
| 2016/0257288 A1* | 9/2016 | Miller | ........................ | B60L 7/18 |
| 2018/0057001 A1* | 3/2018 | Hu | .......................... | B60W 10/11 |
| 2018/0093650 A1* | 4/2018 | Payne | ........................ | B60T 7/22 |
| 2018/0162385 A1* | 6/2018 | Seo | ........................ | B60W 10/06 |
| 2018/0273047 A1* | 9/2018 | Wang | .............. | B60W 30/18154 |
| 2020/0114917 A1* | 4/2020 | Oguro | ........................ | B60T 7/12 |
| 2020/0391764 A1* | 12/2020 | Gotou | .................. | B60W 30/165 |

OTHER PUBLICATIONS

"Ein neues Konzept für die Trajektoriengenerierung und -stabiliserung in zeitkritischen Verkehrsszenarien" [A new concept for trajectory generation and stabilization in time-critical traffic scenarios] (ISBN: 978-3-86644-631-1), 2011.

* cited by examiner

METHOD AND DEVICE FOR OPERATING A MOTOR VEHICLE

CROSS REFERENCE

The present application claims the benefit under 35 U.S.C. § 119 of German Patent Application No. DE 102017221097.4 filed on Nov. 24, 2017, which is expressly incorporated herein by reference in its entirety.

FIELD

The present invention relates to a method for operating a motor vehicle, the motor vehicle being automatically accelerated and decelerated as a function of an instantaneous position and a predefinable target location so that it comes to a standstill at the target location.

In addition, the present invention relates to a device for carrying out the method.

BACKGROUND INFORMATION

Present-day motor vehicles increasingly include driver assistance systems, which also facilitate automated driving functions to relieve the driver. These include, for example, parking assistants and pilots, which in addition to automated transverse guidance also automate the longitudinal guidance of the motor vehicle. To ensure a preferably comfortable longitudinal guidance, conventional approaches plan a longitudinal trajectory based on a residual travel distance starting from the instantaneous position of the motor vehicle up to a predefinable target location. A method is described in the dissertation, "Ein neues Konzept für die Trajektoriengenerierung und—stabiliserung in zeitkritischen Verkehrsszenarien" [A new concept for trajectory generation and stabilization in time-critical traffic scenarios] (ISBN: 978-3-86644-631-1) in which a multitude of possible trajectories are calculated, which, for example, relate to the progression of the acceleration over the residual travel path, and subsequently that trajectory is selected from the multitude of trajectories that has the lowest integrated jolt, weighted using the duration of the trajectory to be driven. As a boundary condition, for example, the instantaneous velocity at the starting point (instantaneous position), a vanishing velocity at the target location, and a maximum velocity are considered for the planning. The selected trajectory is forwarded by downstream controllers to the actuating system of the motor vehicle, in particular the drive unit and the braking system, in order to carry out the desired movement.

During applications which require maneuvering in narrow spaces, for example, during a parking process, very high requirements arise regarding how accurately the target location is reached by the motor vehicle. If, for example, a high stopping accuracy is given, then the space available may be better utilized and tolerances reduced. It may thus be possible to park in narrower spaces or to maneuver into a parking space with fewer movements.

Another challenge arises in that an unintentional, premature stopping of the motor vehicle may occur at very low velocities in the interaction between the drive unit and the braking system, if, for example, the motor vehicle must overcome an obstacle, for example a curb or the like, in order to reach the target location.

SUMMARY

An example method according to the present invention may have the advantage that the target location is always reached safely and accurately by the motor vehicle. The method according to the present invention provides that in a first step a) the motor vehicle is accelerated, in particular from a standstill to a predefined target velocity. This target velocity is maintained and then only reduced when the motor vehicle approaches a first distance of the motor vehicle to the target point. Then, in a second step b), the velocity of the motor vehicle is reduced or the motor vehicle is decelerated until, upon reaching the first distance, it is decelerated to a predefined rolling velocity. This means that the velocity is already reduced prior to reaching the first distance, in order to have reached the rolling velocity upon reaching the first distance. Beginning at a predefined second distance of the motor vehicle to the target location, which is smaller than the first distance, the motor vehicle is decelerated in a third step c) until it comes to a stop. The motor vehicle is thus initially decelerated to the rolling velocity, where it is maintained until the second distance to the target location is reached. Only then is a deceleration of the motor vehicle carried out to the point of stopping. In the rolling phase it is ensured by using the rolling velocity that the motor vehicle is only moved with so much energy that smaller obstacles may also be easily rolled over and that the motor vehicle does not stop prematurely. Only shortly before reaching the target location, namely, upon reaching the second distance, does it transition into the planning which provides, in particular, a vanishing velocity at the target location. Previously, approaches generally attempted to decelerate directly from the setpoint velocity into the target position. In this case, a deceleration, which is perceived as comfortable for the end customer, must thereby be maintained for a long time. Due to inaccuracies or tolerances in the braking system, however, errors build up over time that are difficult to compensate for. This requires higher tolerances in the positioning of the motor vehicle at the target location. In addition, depending on the specification of the function, different setpoint velocities may be provided so that the initial state during the initiation of the brake application may be quite different. These reasons result in the stopping accuracy of the motor vehicle no longer being able to be improved past a certain point. Due to the introduction according to the present invention of a lower rolling velocity below the setpoint velocity, the duration of a comfortable deceleration to a standstill is reduced on the one hand, and on the other hand, a defined initial state is introduced, which in the final phase (rolling phase) is identical in front of the target location, regardless of the setpoint velocity previously used during each maneuver, the stopping accuracy being improved thereby. The rolling phase also counteracts the risk that the motor vehicle stops prematurely and starting up again is required.

Furthermore, it is advantageously provided that the point in time of the deceleration in step b) is predefined as a function of a setpoint deceleration down to the rolling velocity, so that, starting from the first distance, the motor vehicle continues to be moved using the rolling velocity. Thus, another distance to the target location is considered, the additional distance being greater than the first distance and, as a function of the target velocity, the rolling velocity, and the set desired or setpoint deceleration, is determined in such a way that the motor vehicle continues to be moved using the rolling velocity upon reaching the first distance. Thus, because this additional distance is set as a function of the setpoint deceleration, the result is a comfortable setpoint deceleration that is always ensured. Depending on the distance to the target location, the setpoint deceleration merely begins earlier or later.

The setpoint deceleration is preferably predefined between 0.1 m/s² to 1 m/s². This corresponds to a comfortable deceleration which ensures a pleasant driving experience.

It is additionally preferably provided that the instantaneous driving velocity is compared with the rolling velocity, the rolling velocity then being set to the minimum of the driving velocity, if the driving velocity falls below the rolling velocity prior to step c). Thereby, undershooting of the instantaneous driving velocity may be taken into consideration. If the instantaneous driving velocity reaches a value below the rolling velocity, thus undershoots the rolling velocity, it is provided that the rolling velocity is set to the minimum of the undershot velocity, thus is set to the minimum of the driving velocity. This has the advantage that, following the initiation of the deceleration to the rolling velocity, no renewed acceleration is carried out up to the, if necessary, already undershot rolling velocity. Thus, a jolt is prevented or at least reduced and the comfort of the brake application is increased. The stopping accuracy is also improved because the last step regarding braking or regarding the deceleration to a standstill is not initiated from an acceleration phase.

In addition, it is preferably provided that the rolling velocity is predefined as greater than or equal to a predefined minimum velocity. Thus, in any case, even in the case of undershooting, it prevents the rolling velocity from falling below a predefined minimum value, as described above. The minimum value or the minimum velocity is thereby selected in such a way that the rolling velocity falls below a predefined minimum value. The minimum value or the minimum velocity is thereby selected in such a way that a premature stopping of the motor vehicle due to a target velocity that is too low is prevented.

Furthermore, it is preferably provided that the motor vehicle is constantly decelerated up to the target location starting from a third distance to the target location, which is smaller than the second distance. This results in the fact that no chronologically short trajectories have to be planned, thus, the stopping accuracy is increased in contrast to the conventional method.

According to one preferred refinement of the present invention, if the entire travel path to reaching the target location is smaller than the first distance, then the motor vehicle is accelerated to the minimum velocity in step a). Thus, this prevents the motor vehicle from being accelerated unnecessarily in a short travel segment. Thus, the driving comfort is also optimized for driving procedures on short driving segments.

The target velocity is preferably predefined between 0.5 km/h through 20 km/h, in particular from 1 km/h through 10 km/h.

Furthermore, it is preferably provided that the rolling velocity is predefined between 0.1 km/h through 1 km/h, in particular between 0.2 km/h through 0.6 km/h. In addition, it is preferably provided that the minimum velocity is predefined between 0.05 km/h through 0.7 km/h, in particular between 0.1 km/h through 0.4 km/h.

Furthermore, the first distance is preferably predefined between 30 cm and 250 cm, in particular between 70 cm and 150 cm.

In addition, the second distance is preferably predefined between 20 cm and 120 cm, in particular between 40 cm and 80 cm.

Furthermore, the third distance is preferably predefined between 5 cm and 60 cm, in particular between 10 cm and 30 cm.

Furthermore, the total travel distance is preferably predefined between 1 cm and 2000 cm, in particular between 5 cm and 1000 cm.

The device according to the present invention having the features of claim 15 is characterized in that it is specifically configured as a control unit, to carry out the method according to the present invention when used as intended.

Below, the present invention is explained in greater detail using the figures.

DETAILED DESCRIPTION OF EXAMPLE EMBODIMENTS

Figure 1:
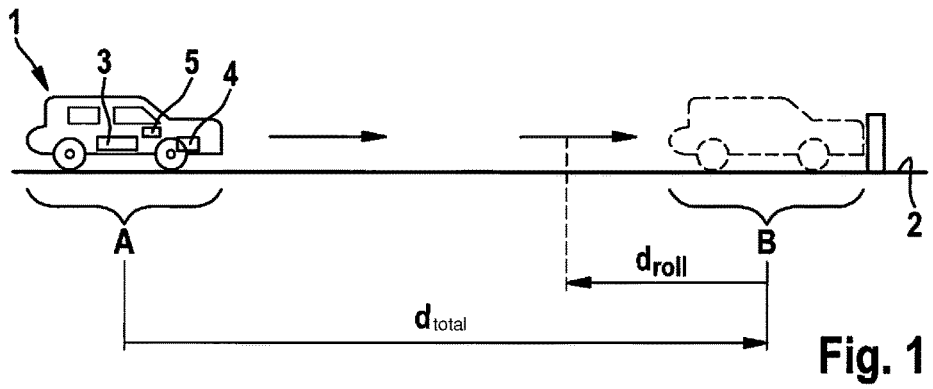
FIG. 1 shows a motor vehicle in a simplified representation.

FIG. 1 shows a simplified representation of a motor vehicle 1, which is located on solid ground, for example, a parking lot 2, at a position A. Motor vehicle 1 has a drive unit 3, which includes, for example, an internal combustion engine and/or at least an electric machine, which is connected or connectable to the wheels of the motor vehicle directly or via a transmission. Furthermore, motor vehicle 1 includes a braking system 4, which may exert a brake force as needed on at least one wheel of motor vehicle 1 to decelerate motor vehicle 1. In particular, if drive unit 3 includes one or multiple electric machines, then these may also be used by braking system 4 for decelerating or braking motor vehicle 1. Otherwise, braking system 4 preferably includes one or multiple wheel brakes which interact mechanically, for example, through friction, with the wheels of the motor vehicle. Furthermore, motor vehicle 1 includes a control unit 5 which is designed to control drive unit 3 and braking system 4 in such a way that an autonomous or automated longitudinal guiding of motor vehicle 1 to reach target location B is enabled. For example, target location B is a parking space on parking lot 2 into which motor vehicle 1 is to be moved.

One advantageous method for operating motor vehicle 1 is explained below by way of the flow chart in FIG. 2, the method being carried out in particular by control unit 5.

In a first step S1, the method is initialized, for example, in that the driver of motor vehicle 1 predefines or selects target location B and starts an automated parking operation/driving operation. In a subsequent step S2, control unit 5 calculates the travel path $d_{total}$ from instantaneous position A to target position B, which must be traveled by motor vehicle 1 to arrive at target location B.

Depending on the travel path established in step S2, a trajectory is determined in subsequent step S3, which represents the acceleration progression of motor vehicle 1 to reach target location B, so that motor vehicle 1 comes to a standstill at target location B. In the present case, it is thereby assumed that vehicle 1 is likewise stopped at instantaneous location A.

During the trajectory formation, three trajectory segments are advantageously formed which are a function of the total distance $d_{total}$. Initially in a step S4, a setpoint velocity $v_{tar}$ is predefined, up to which motor vehicle 1 is to be accelerated starting from point of departure A. The time is also established within which the target velocity is to be maintained.

The time is thereby determined by a distance $d_{roll}$ to target location B, as is shown in FIG. 1. In step S5, in addition to distance $d_{roll}$, a rolling velocity $v_{roll}$ is also determined, which motor vehicle 1 is to have reached upon reaching distance $d_{roll}$.

Figure 2:
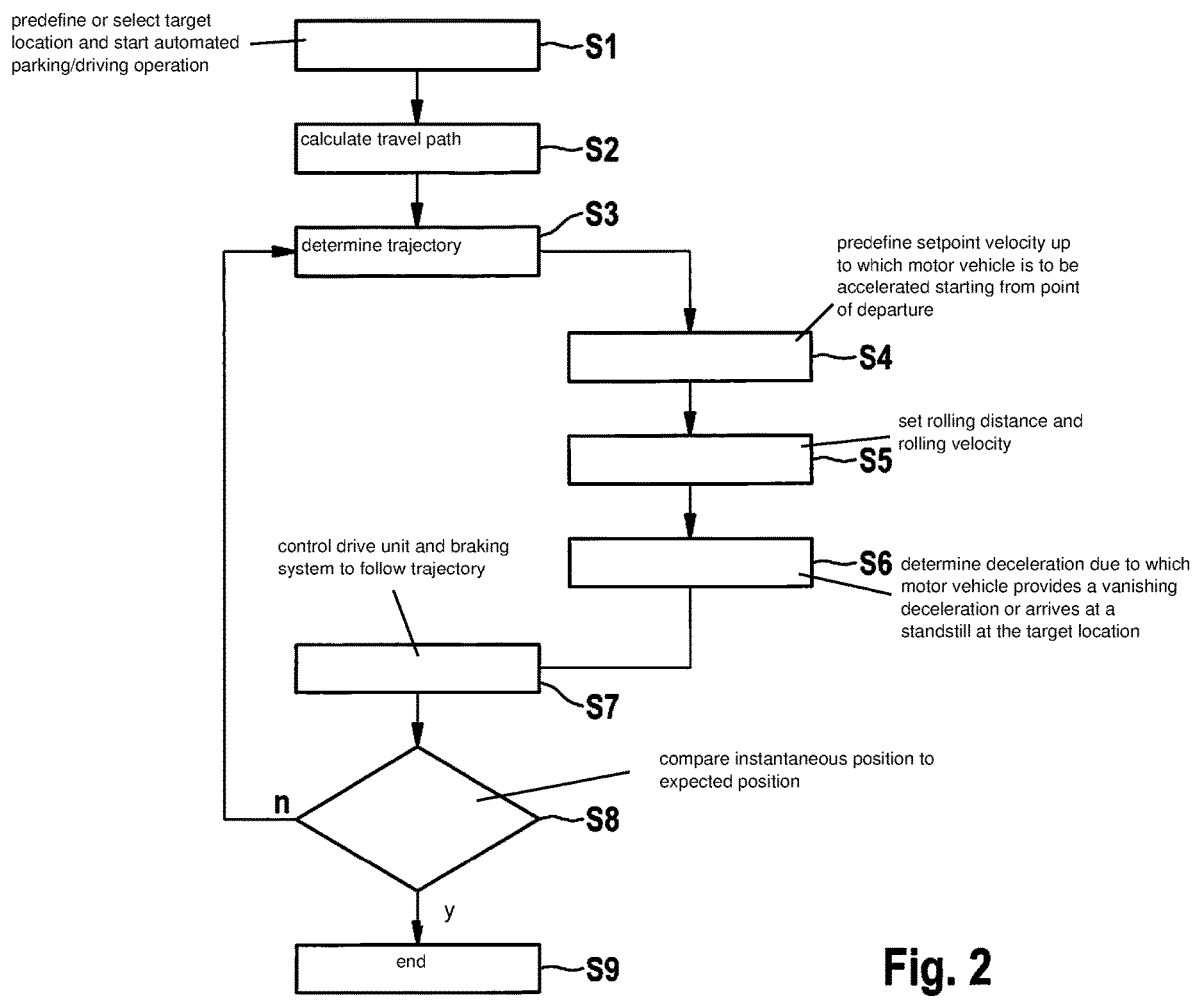
FIG. 2 shows a flow chart for explaining one advantageous method for operating the motor vehicle.
Figure 3:
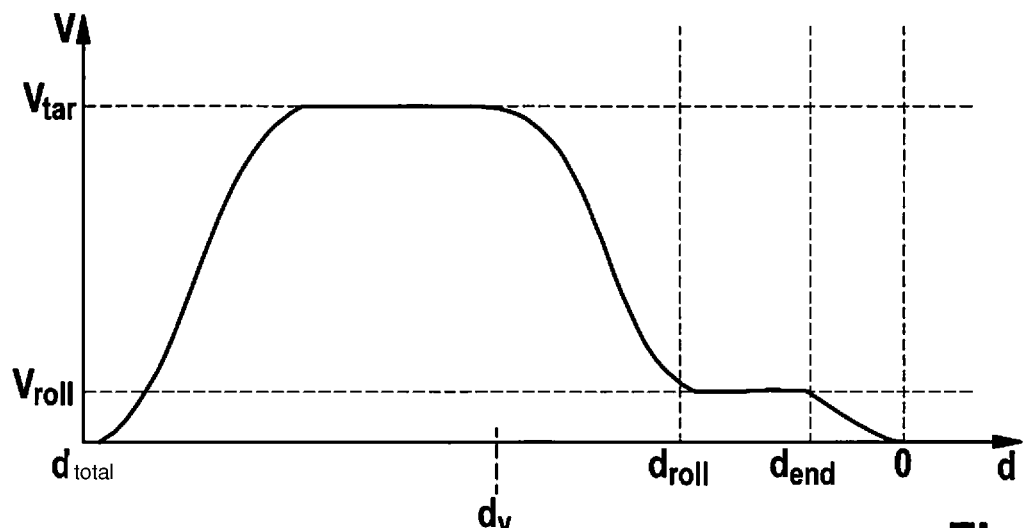
FIG. 3 shows a diagram for explaining the method.

In this context, FIG. 3 shows in a diagram the velocity progression of motor vehicle 1, which arises from the method described according to FIG. 2 and FIG. 1. It is thereby apparent that if the motor vehicle is to already have reached rolling velocity $v_{roll}$ at distance $d_{roll}$, then the velocity of the motor vehicle must be reduced at a preceding point in time or at distance $d_v$. In the present case, distance $d_v$, which is greater than distance $d_{roll}$ to target location B, is preferably selected as a function of a setpoint deceleration. In particular, a setpoint deceleration in the range of 0.1 m/s² through 1 m/s² is assumed here. Distance $d_v$ is thus selected as a function of setpoint velocity $v_{tar}$ and distance $d_{roll}$. The rolling velocity is maintained until the distance to target location B is reduced to a distance $d_{end}$.

Upon reaching distance $d_{end}$, a deceleration is determined in step S6 due to which motor vehicle 1 provides a vanishing velocity or arrives at a standstill at target location B (distance=0).

In a step S7, the actuators or drive unit 3 and braking system 4 are controlled to follow the trajectory according to FIG. 3. The trajectory being able to be checked and adjusted while the method is being carried out or already during the movement operation. In particular, the instantaneous position of motor vehicle 1 is constantly monitored in a step S8 and compared with an expected position or setpoint position predicted according to the trajectory. If the instantaneous position does not correspond to the expected position, or the position of the motor vehicle upon standstill does not correspond to end position B (n), then the method is carried out again in a step S3, if necessary with a new trajectory planning. If motor vehicle 1 follows the predefined trajectory, then the method is carried out again until motor vehicle 1 comes to a standstill at target location B. If the instantaneous position then corresponds to desired end position (j), then the method is ended in step S9.

Figure 4:
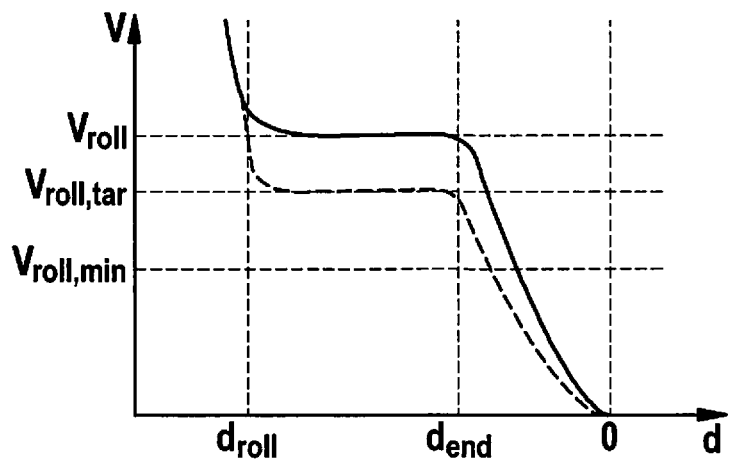
FIG. 4 shows one exemplary embodiment of the method.

FIG. 4 shows another exemplary embodiment of the previously described method, an enlarged detail of the diagram from FIG. 3 being shown in FIG. 4, which relates to the end area of the movement of the motor vehicle. According to this exemplary embodiment, it is provided that, when the instantaneous driving velocity falls below the predefined rolling velocity $v_{roll}$ during the deceleration to $d_{roll}$, the setpoint velocity or the setpoint rolling velocity $V_{roll,tar}$ is adjusted or set to the minimum of undershoot $v_{roll,min}$. This has the advantage that, in the case of undershooting, it is no longer accelerated back to the setpoint rolling velocity. This reduces the jolt and the comfort of the brake application is increased. The stopping accuracy is also improved thereby since the last brake phase starting at $d_{end}$ is not initiated directly from an acceleration phase.

Target rolling velocity $v_{roll,tar}$ is preferably always set as greater than or equal to minimum velocity $v_{roll,min}$, so that in particular a premature stopping of motor vehicle 1 due to a target velocity that is too low is prevented. The minimum velocity may thereby be adjusted, for example, as a function of an instantaneous roadway incline.

Figure 5:
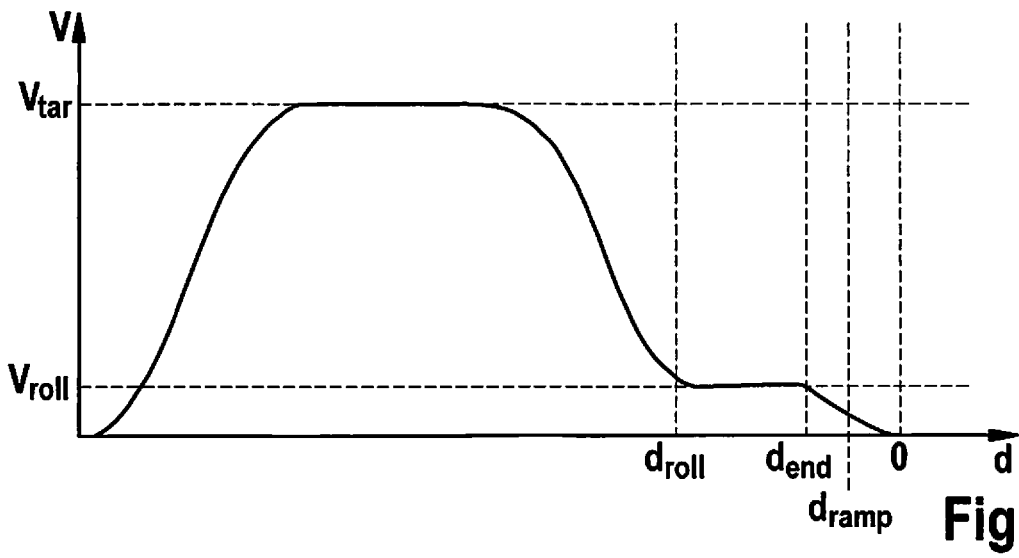
FIG. 5 shows another exemplary embodiment of the method.

FIG. 5 shows another exemplary embodiment that differs from the previous exemplary embodiments in that, starting at distance $d_{ramp}$, which is smaller than distance $d_{end}$, a constant deceleration is used up to the target location. This has the advantage that no chronologically short trajectories need to be planned, whereby the stopping accuracy is improved.

In the case that total distance $d_{total}$ is less than distance $d_{roll}$, minimum velocity $v_{roll,min}$ is used as the target velocity for the controller, which means, for example, in contrast to long moves, a target velocity requested by another control unit is ignored. This has the advantage, that no unnecessarily strong accelerations are used for short movements or motions, thus the comfort and stopping accuracy are improved.

In the following, preferred variables for target velocity $v_{tar}$, rolling velocity $v_{roll}$, and minimum velocity $v_{roll,min}$ and as well for the various distances are indicated, the absolute value being indicated with regard to the distances, even if the distances appear as negatives in the figures.

$v_{tar}$: 0.5 km/h through 20 km/h, preferably 1 km/h through 10 km/h $v_{roll}$: 0.1 km/h through 1 km/h, preferably 0.2 km/h through 0.6 km/h $V_{roll,min}$: 0.05 km/h through 0.7 km/h, preferably 0.1 km/h through 0.4 km/h $d_{ramp}$: 5 cm through 60 cm, preferably 10 cm through 30 cm $d_{end}$: 20 cm through 120 cm, preferably 40 cm through 80 cm $d_{roll}$: 30 cm through 250 cm, preferably 70 cm through 150 cm $d_{total}$: 1 cm through 2000 cm, preferably 5 cm through 1000 cm

What is claimed is:

1. A method for operating a motor vehicle, the method comprising:
   a) automatically accelerating the motor vehicle from a standstill, to a predefined setpoint velocity;
   b) automatically decelerating, up to a predefined first distance of the motor vehicle to a target location, the motor vehicle to a predefined rolling velocity, wherein the motor vehicle is automatically accelerated and decelerated as a function of an instantaneous position and a predefinable target location; and
   c) starting at a predefined second distance of the motor vehicle to the target location, decelerating the motor vehicle to a standstill, the second distance to the predefinable target location being smaller than the first distance, wherein the motor vehicle comes to a standstill at the target location;
   wherein the motor vehicle is initially decelerated to the rolling velocity, where the rolling velocity is maintained until the second distance to the target location is reached, wherein only then is a deceleration of the motor vehicle carried out to the point of stopping, wherein in a rolling phase, the motor vehicle is moved by using the rolling velocity so that the motor vehicle does not stop prematurely, and wherein before reaching the target location, which is the second distance, the motor vehicle transitions into a planning phase which provides a vanishing velocity at the target location, and wherein an instantaneous driving velocity falls below the predefined rolling velocity during the deceleration results in the setpoint velocity or a setpoint rolling velocity being adjusted or set to a minimum of an undershoot velocity, so that in the case of undershooting, the vehicle is no longer accelerated back to the setpoint rolling velocity, so as to reduce jolt as brake application is increased, and so that a last brake phase is not initiated directly from an acceleration phase, wherein the instantaneous driving velocity is compared with the rolling velocity, the rolling velocity then being set to a minimum of the driving velocity when the driving velocity falls below the rolling velocity immediately prior to c), wherein the rolling velocity is predefined to be greater than or equal to a predefined minimum velocity, so that during undershooting, the rolling velocity is prevented from falling below a predefined minimum velocity, so that the minimum velocity is selected so that the rolling velocity falls below a predefined minimum value, and so that the minimum velocity is selected so that a premature stopping of the motor vehicle due to a target velocity that is too low is prevented, wherein at a third distance to the target location, which is smaller than the second distance, the motor vehicle is constantly decelerated up to the target location, so that no successive trajectories must be planned, wherein a velocity is already reduced prior to reaching the first distance, in order to have reached the rolling velocity upon reaching the first distance, and wherein the predefined minimum value is above zero, since the rolling velocity cannot fall below the predefined minimum value.

2. The method as recited in claim 1, wherein a point in time of the deceleration in b) is determined as a function of a setpoint deceleration so that the motor vehicle continues to be moved at the rolling velocity starting at the first distance.

3. The method as recited in claim 1, wherein the setpoint deceleration is predefined between 0.1 m/s$^2$ through 1 m/s$^2$.

4. The method as recited in claim 1, wherein, if a total distance to reach the target location is smaller than the first distance, then the motor vehicle is accelerated to the minimum velocity in a).

5. The method as recited in claim 1, wherein the target velocity is predefined to be between 0.5 km/h and 20 km/h.

6. The method as recited in claim 5, wherein the target velocity is predefined to be between 1 km/h and 10 km/h.

7. The method as recited in claim 1, wherein the rolling velocity is predefined to be between 0.1 km/h and 1 km/h.

8. The method as recited in claim 7, wherein the rolling velocity is predefined to be between 0.2 km/h and 0.6 km/h.

9. The method as recited in claim 1, wherein the minimum velocity is predefined to be between 0.05 km/h and 0.7 km/h.

10. The method as recited in claim 9, wherein the minimum velocity is predefined to be between 0.1 km/h through 0.4 km/h.

11. The method as recited in claim 1, wherein a predefined first distance is predefined to be between 30 cm and 250 cm.

12. The method as recited in claim 11, wherein the predefined first distance is predefined to be between 70 cm and 150 cm.

13. The method as recited in claim 1, wherein a predefined second distance is predefined to be between 20 cm and 120 cm.

14. The method as recited in claim 13, wherein the predefined second distance is predefined to be between 40 cm and 80 cm.

15. The method as recited in claim 1, wherein a predefined third distance is predefined to be between 5 cm and 60 cm.

16. The method as recited in claim 15, wherein the predefined third distance is predefined to be between 10 cm and 30 cm.

17. The method as recited in claim 4, wherein a predefined total distance is predefined to be between 1 cm and 2000 cm.

18. The method as recited in claim 17, wherein the predefined total distance is predefined to be between 5 cm and 1000 cm.

19. A device for operating a motor vehicle, which includes a controllable drive unit and a controllable braking system, comprising:

a control unit for operating the motor vehicle, and being configured to perform the following:

a) automatically accelerating the motor vehicle from a standstill, to a predefined setpoint velocity;

b) automatically decelerating, up to a predefined first distance of the motor vehicle to a target location, the motor vehicle to a predefined rolling velocity, wherein the motor vehicle is automatically accelerated and decelerated as a function of an instantaneous position and a predefinable target location; and c) starting at a predefined second distance of the motor vehicle to the target location, decelerate the motor vehicle to a standstill, the second distance to the target location being smaller than the first distance, wherein the motor vehicle comes to a standstill at the target location;

wherein the motor vehicle is initially decelerated to the rolling velocity, where the rolling velocity is maintained until the second distance to the target location is reached, wherein only then is a deceleration of the motor vehicle carried out to the point of stopping, wherein in a rolling phase, the motor vehicle is moved by using the rolling velocity so that the motor vehicle does not stop prematurely, and wherein before reaching the target location, which is the second distance, the motor vehicle transitions into a planning phase which provides a vanishing velocity at the target location, and wherein an instantaneous driving velocity falling below the predefined rolling velocity during the deceleration results in the setpoint velocity or a setpoint rolling velocity being adjusted or set to a minimum of an undershoot velocity, so that in the case of undershooting, the vehicle is no longer accelerated back to the setpoint rolling velocity, so as to reduce jolt as brake application is increased, and so that a last brake phase is not initiated directly from an acceleration phase, wherein the instantaneous driving velocity is compared with the rolling velocity, the rolling velocity then being set to a minimum of the driving velocity when the driving velocity falls below the rolling velocity immediately prior to c), wherein the rolling velocity is predefined to be greater than or equal to a predefined minimum velocity, so that during undershooting, the rolling velocity is prevented from falling below a predefined minimum velocity, so that the minimum velocity is selected so that the rolling velocity falls below a predefined minimum value, and so that the minimum velocity is selected so that a premature stopping of the motor vehicle due to a target velocity that is too low is prevented, wherein at a third distance to the target location, which is smaller than the second distance, the motor vehicle is constantly decelerated up to the target location, so that no successive must be planned, wherein a velocity is already reduced prior to reaching the first distance, in order to have reached the rolling velocity upon reaching the first distance, and wherein the predefined minimum value is above zero, since the rolling velocity cannot fall below the predefined minimum value.

* * * * *